(12) United States Patent
Choi

(10) Patent No.: US 8,422,449 B2
(45) Date of Patent: Apr. 16, 2013

(54) MU-MIMO METHOD IN WLAN SYSTEM, AND ACCESS POINT AND STATION FOR MU-MIMO

(75) Inventor: In-Kyeong Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 363 days.

(21) Appl. No.: 12/910,734

(22) Filed: Oct. 22, 2010

(65) Prior Publication Data

US 2011/0096738 A1    Apr. 28, 2011

(30) Foreign Application Priority Data

Oct. 23, 2009   (KR) .................... 10-2009-0101259

(51) Int. Cl.
*H04W 4/00*    (2009.01)

(52) U.S. Cl.
USPC ..................... 370/329; 370/338; 370/341

(58) Field of Classification Search ............... None
See application file for complete search history.

(56) References Cited

U.S. PATENT DOCUMENTS

| 2010/0111211 | A1  | 5/2010 | Han et al. | |
|---|---|---|---|---|
| 2010/0173659 | A1* | 7/2010 | Shin et al. | 455/500 |
| 2010/0190447 | A1* | 7/2010 | Agrawal et al. | 455/63.1 |
| 2010/0232488 | A1* | 9/2010 | Song et al. | 375/224 |
| 2010/0232494 | A1* | 9/2010 | Gaur | 375/233 |
| 2010/0239032 | A1* | 9/2010 | Chen et al. | 375/260 |
| 2011/0194551 | A1* | 8/2011 | Lee et al. | 370/342 |
| 2012/0176885 | A1* | 7/2012 | Lee et al. | 370/209 |

FOREIGN PATENT DOCUMENTS

KR    1020060124088 A    12/2006

OTHER PUBLICATIONS

Kaibin Huang et al., "Performance of Orthogonal Beamforming for SDMA With Limited Feedback", IEEE Transactions on Vehicular Technology, Jan. 2009, pp. 152-164, vol. 58 No. 1, IEEE.

* cited by examiner

*Primary Examiner* — Chi Pham
*Assistant Examiner* — Soon-Dong D Hyun

(57) ABSTRACT

A MU-MIMO method of an access point in a WLAN using multi-channels and having at least one station includes: receiving index information indicating a precoding vector for a beam selected by the station and channel quality information thereof for each one of the multi-channels; generating first channel capacity information of channel combination groups using the channel quality information wherein the channel combination groups are grouped according to a predetermined channel bandwidth of the multi-channels; and allocating resources to the station from a channel combination selected from the channel combination groups according to the first channel capacity information using the index information and the channel quality information, wherein the access point and the station previously store precoding vector information for a plurality of beams for the MU-MIMO.

18 Claims, 2 Drawing Sheets

{ US 8,422,449 B2 }

MU-MIMO METHOD IN WLAN SYSTEM, AND ACCESS POINT AND STATION FOR MU-MIMO

CROSS-REFERENCE(S) TO RELATED APPLICATIONS

The present application claims priority of Korean Patent Application No. 10-2009-0101259, filed on Oct. 23, 2009, which is incorporated herein by reference in its entirety.

BACKGROUND OF THE INVENTION

1. Field of the Invention

Exemplary embodiments of the present invention relate to a multi-user multi-input multi-output (MU-MIMO) method, and an access point and a station for MU-MIMO; and, more particularly, to a MU-MIMO method in a wireless local area network (WLAN) system using multi-channel, and an access point and a station for MU-MIMO.

2. Description of Related Art

A wireless local area network (WLAN) defined in IEEE 802.11 supports a basic service set (BSS) formed of an access point and a station (STA). Lately, IEEE 802.11n was introduced. IEEE 802.11n supports a multi-input multi-output (MIMO) method for performing communication through an access point and a station which include a plurality of antennas in order to obtain high throughput (HT). The IEEE 802.22n MIMO method is a single user (SU) MIMO method where a transmitter performs a precoding operation using channel state information (CSI) for Tx beamforming (Tx BF).

In IEEE 802.11n, one frequency band channel is used for one basic service set (BBS). IEEE 802.11TGac has been developed as a follow-up standard of IEEE 802.11n. IEEE 802.11TGac requires throughput of 500 Mbps for single-access or throughput of 1 Gbps for multi-access in a MAC layer in order to support very high throughput (VHT). In order to satisfy such a requirement, IEEE 802.11 TGac was developed to support a MU-MIMO method and multi-channel.

In case of MU-MIMO, each station feeds back a channel state information matrix or a beamforming matrix to an access point. The access point performs a precoding operation using the feedback channel station information matrix (Vector) or the beamforming matrix (vector). The amount of feedback channel station information vector or beamforming vector is comparatively large. In case of using multi-channel, the amount of feedback channel station information vector or beamforming vector increases as much as the number of multi-channels because information is required to be fed back per each channel. Therefore, it has been required to develop a method for improving throughput by reducing the amount of feedback information in a WLAN system using multi-channel and MU-MIMO.

SUMMARY OF THE INVENTION

An embodiment of the present invention is directed to a MU-MIMO method in a WLAN system for improving throughput and an access point and a station for MU-MIMO.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a multi-user multi-input multi-output (MU-MIMO) method of an access point in a wireless local area network (WLAN) using multi-channels and having at least one station includes: receiving index information indicating a precoding vector for a beam selected by the station and channel quality information thereof for each one of the multi-channels; generating first channel capacity information of channel combination groups using the channel quality information wherein the channel combination groups are grouped according to a predetermined channel bandwidth of the multi-channels; and allocating resources to the station from a channel combination selected from the channel combination groups according to the first channel capacity information using the index information and the channel quality information, wherein the access point and the station previously store precoding vector information for a plurality of beams for the MU-MIMO.

In accordance with another embodiment of the present invention, a multi-user multi-input multi-output (MU-MIMO) method of a station in a wireless local area network (WLAL) using multi-channels includes: generating channel quality information for each one of a plurality of beams for each one of the multi-channels using channel estimation result information, which is estimated through a channel estimation preamble; and precoding vector information for the plurality of beams, selecting at least one among the plurality of beams using the channel quality information, and transmitting index information indicating a precoding vector for the selected beam and the channel quality information to an access point that stores the precoding vector information.

In accordance with another embodiment of the present invention, an access point for multi-user multi-input multi-output (MU-MIMO) in a wireless local area network (WLAN) using multi-channels and having at least one stations includes: an information receiver configured to receive index information and channel quality information for each one of the multi-channel where the index information indicates a precoding vector for a beam selected by a station; an information generator configured to generate first channel capacity information of a channel combination group according to a channel bandwidth predetermined among the multi-channels using the channel quality information; and an allocator configured to allocate resource to the station from a channel combination selected among the channel combination groups according to the first channel capacity information using the index information and the channel quality information, wherein the access point and the station previously store precoding vector information for a plurality of beams for the MU-MIMO.

In accordance with another embodiment of the present invention, a station for multi-user multi-input multi-output (MU-MIMO) in a wireless local area network (WLAN) using multi-channels includes: an information generator configured to generate channel quality information for each one of a plurality of multi-beams for each one of the multi-channels using channel estimation result information, which is estimated through a channel estimation preamble received from an access point, and using precoding vector information for the plurality of beams for the MU-MIMO; a selector configured to select at least one of the plurality of beams using the channel quality information; and a transmitter configured to transmit index information indicating a precoding vector for the selected beam and the channel quality information to the access point that stores the precoding vector information.

DESCRIPTION OF SPECIFIC EMBODIMENTS

Figure 1:
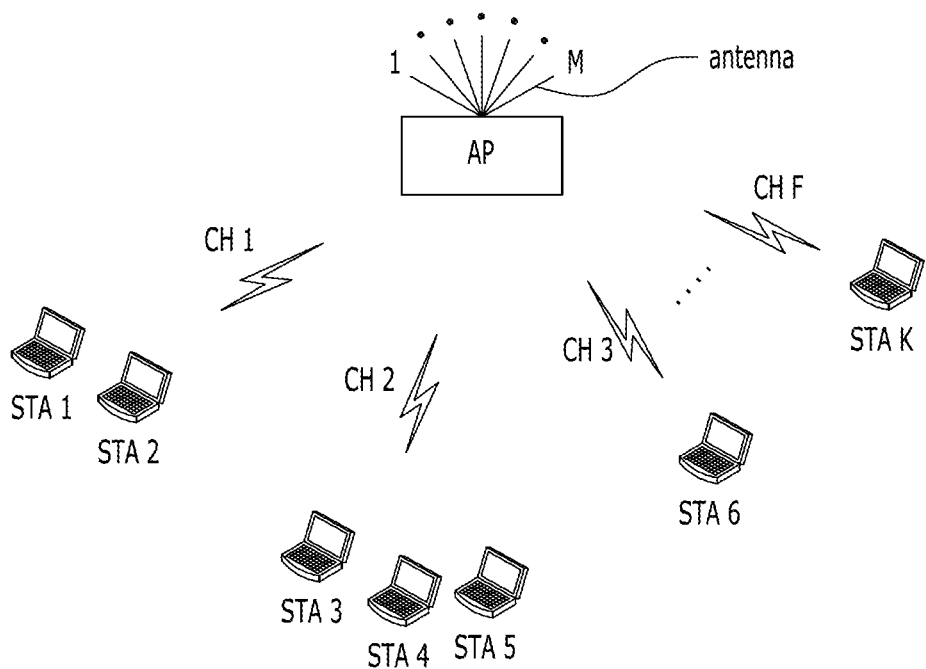
FIG. 1 is a diagram illustrating a multi-channel wireless local area network (WLAN) in accordance with an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

The present invention relates a multi-user multi-input multi-output (MU-MIMO) method for reducing an amount of feedback information by sharing precoding vector information for MU-MIMO with an access point and a station. Particularly, in embodiments of the present invention, an access point and a station store the same precoding vector information. The station may transmit index information of a preferred precoding vector among precoding vectors of a plurality of beams included in the precoding vector information. That is, since the station feeds back index information, not a precoding vector, to the access point, the feedback information is reduced. The access point performs the precoding operation using the index information from the station. It will be described as follows.

In embodiments of the present invention, an access point and a station in a WEAN system using multi-channel share precoding vector information for a plurality of beams for MU-MIMO. That is, the access point and the station store the same precoding vector information. Here, the precoding vector information includes precoding vectors for each one of a plurality of beams as beamforming vector information for performing a precoding operation for MU-MIMO. The precoding vectors of the plurality of beams may be included in the precoding vector information as a form of a column vector.

The station transmits index information of a preferred beam among the precoding vectors of multi-channel to the access point. That is, the index information indicates a precoding vector of the preferred beam of the station among the precoding vectors included in the precoding vector information. Here, the station generates channel quality information of each one of a plurality of beams by multi-channel and selects a preferred beam using the channel quality information. The station transmits the index information to the access point with the channel quality information.

The access point recognizes a preferred precoding vector of the station among the precoding vector information using the index information and the channel quality information. The access point performs a precoding operation using the preferred precoding vector of the station and performs MU-MIMO by allocating the preferred beam to the station.

Accordingly, the station is not required to feed back channel station information vector or beamforming vector to the access point in accordance with an embodiment of the present invention. An amount of feedback information reduced because the index information of the preferred beam of the station and the channel quality information are fed back to the access point. Therefore, throughput is improved as much as a reduction amount of the feedback information Hereinafter, embodiments of the present invention will be described in more detail with reference to FIGS. 1 to 4.

FIG. 1 is a diagram illustrating a multi-channel wireless local area network (WLAN) in accordance with an embodiment of the present invention.

As shown in FIG. 1, the WLAN system in accordance with an embodiment of the present invention includes an access point AP and a plurality of stations STA_1 to STA_K where K denotes a natural number. The access point communicates with the plurality of stations using multi-channels CH_1 to CH_F where F denotes a natural number. Here, the WLAN system may be one basic service set (BSS).

Regarding a channel bandwidth used in the WLAN system in accordance with an embodiment of the present invention, the multi-channels may be formed of one or a plurality of contiguous or non-contiguous idle channel bands. The multi-channels are a synchronous channel and the aces point can communicate with a plurality of stations at the same time using the multi-channels.

For example, it is assumed that a WLAN system uses a channel bandwidth of 80 MHz and available channel bands are 20 MHz, 40 MHz, and 80 MHz. It is also assumed that the channel bandwidth includes four 20 MHz channel bands $f^1$, $f^2$, $f^3$, and $f^4$. Under these assumptions, 40 MHz channel bands $f^5$, $f^6$, and $f^7$ may be sum of two 20 MHz channel bands $f^1$ and $f^2$, $f^2$ and $f^3$, or $f^3$ and $f^4$ ($f^5=f^1+f^2$, $f^6=f^2+f^3$, $f^7=f^3+f^4$). Further, 80 MHz channel band $f^8$ may be sum of four 20 MHz channel band $f^1$, $f^2$, $f^3$, and $f^4$ ($f^8=f^1+f^2+f^3+f^4$). A channel combination group of a 80 MHz channel bandwidth may include six channel combinations such as $\{f^1, f^2, f^3, f^4\}$, $\{f^1, f^2, f^7\}$, $\{f^1, f^6, f^4\}$, $\{f^5, f^3, f^4\}$, $\{f^1, f^5, f^7\}$, and $\{f^8\}$. In this case, the WLAN of FIG. 1 includes eight channels CH_1 to CH_8.

The access point informs available channel bands to each station at one basic service set. In FIG. 1, a first station STA_1 communicates with the access point through a first channel CH_1. However, the first station STA_1 may have more available channels.

As described above, the stations and the access point share precoding vector information of a plurality of beams in the embodiment of the present invention. When the access point includes M antennas as shown in FIG. 1 and M is 8, where M is a natural number, the precoding vector information may maximally include eight precoding vectors. The stations use channel quality information for each one of a plurality of beams in order to select a preferred beam from the plurality of beams. The channel quality information includes information that indicate quality of channel. For example, the channel quality information may be a signal to interference ratio (SINR) or a signal to noise ratio (SNR). That is, the stations may select a beam having the best SINR and feed index information back to the access point with the channel quality information. Here, the index information indicates a precoding vector for the selected beam.

In order to select an optimal channel combination from a channel combination group, the access point generates channel capacity information for each one of multi-channels using the channel quality information. The access point allocates resources to each station from the selected channel combination using the index information and the channel quality information. That is, the access point allocates a frequency channel and a beam to the station.

Hereinafter, a MU-MIMO method of the above described WLAN system in accordance with an embodiment of the present invention will be described in more detail. The MU- MIMO method in accordance with an embodiment of the present invention will be described based on an example where a $k^{th}$ station (STA_K) among K stations generates channel quality information for an $m^{th}$ beam among M beams.

The access point may request at least one station to send index information and channel quality information for MU-MIMO at each one of multi-channels. The access point may receive a response thereof from the station. The access point regards the station sending the response as a MU-MIMO candidate and transmits a channel estimation preamble to the MU-MIMO candidate.

The station may estimate a channel using the received channel estimation preamble. The channel estimation result may be a channel matrix H. When $\{H^1, H^2, \ldots, H^F\}$ denote channel matrixes of F channel bands, $H^f = [H_1^{fT}, \ldots, H_K^{fT}]^T$ T denote channel matrixes of a plurality of stations at a channel band f among F channel bands, where f=1, 2, ..., F. Here, $H_1^{fT}$ denotes a channel matrix between the access point and the $k^{th}$ station (STA_K) at a channel band f, and T denotes a transposed matrix.

The station generates channel quality information for each one of the plurality of beams per multi-channels using the estimated channel matrix and previously stored precoding vector information (U). The precoding vector information may be referred as $U = [u_1, \ldots, u_M]$, and each precoding vector is orthogonal to other precoding vector.

The station may generate the channel quality information for each one of the plurality of beams using Eq. 1 as below. Eq. 1 shows a reception signal of a station for an $m^{th}$ beam at a channel band f. In Eq. 1, S denotes a symbol of a $m^{th}$ beam. In Eq. 1, $H_k^f u_m s_m$ denotes an $m^{th}$ beam signal, $$\sum_{m' \neq m}^{M} H_k^f u_m s_{m'}$$

denotes an interference signal of the $m^{th}$ beam, and $n_k$ denotes a noise signal. The interference signal is an interference signal caused by other beams except the $m^{th}$, beam. The station may calculate a SINR using a beam signal, an interference signal, and a noise of a reception signal.

$$y_k^f = H_k^f U s + n_k = H_k^f u_m s_m + \sum_{m' \neq m}^{M} H_k^f u_m s_{m'} + n_k \quad \text{Eq. 1}$$

The station selects one beam for each one of multi-channels based on the channel quality information and feeds back the index information of the selected beam and the channel quality information to the access point. The station may select a plurality of beams according to the channel quality information.

The access point searches an optimal station for each beam using the feedback index information and the channel quality information from the plurality of stations. The access point may select a station that transmits the best channel quality information for each beam as an optimal station. The best channel quality information may be the largest SINR value. For example, when a $k^{th}$ station (STA_k) is selected as the optimal station for the $m^{th}$ beam at a channel band f, an index of a beam allocated to the selected station (STA_k) may be shown as $m_{(k_m^f)^*}$.

A precoding vector for each one of a plurality of beams selected at a channel band f may be shown as follows.

$$\tilde{U}^f = [u_{1_{(k_1^f)^*}} \cdots u_{m_{(k_m^f)^*}} \cdots u_{M_{(k_M^f)^*}}]$$

Here, $$u_{m_{(k_m^f)}}$$

denotes that the $m^{th}$ beam is allocated at $k^{th}$ station (STA_k, $(k_m^f)^*$). And here, denotes a station selected for a beam among the plurality of beams. That is, $u_1$ may denotes a precoding vector for a first beam allocated to a first station. $U_m$ may denotes a precoding vector for an $m^{th}$ beam allocated to a $k^{th}$ station (STA_k).

The access point may calculate a channel capacity ($C^f$) based on Eq. 2 using the channel quality information of a station selected for each beam of each channel band. That is, the access point generates first channel capacity information for multi-channels CH_1 to CH_F. In Eq. 2, $q_{(k_m^f)^*}$ denotes channel quality information transmitted from the selected station. For example, $q_{(k_m^f)^*}$ denotes a SINR value.

$$C^f = \sum_{m=1}^{M} \log_2\left(1 + q_{(k_m^f)^*}\right), \text{ where } f = 1, \ldots, F \quad \text{Eq. 2}$$

The access point generates second channel capacity information for channel combination using the generated first channel capacity information. That is, the access point generates the second channel capacity information for six channel combinations such as $\{f^1, f^2, f^3, f^4\}$, $\{f^1, f^2, f^7\}$, $\{f^1, f^-, f^4\}$, $\{f^5, f^3, f^4\}$, $\{f^1, f^5, f^7\}$, and $\{f^8\}$. The access point may generate channel capacity information for the channel combination by adding channel capacity information of each channel band.

The access point may select channel combination having the largest channel capacity based on the second channel capacity information and may allocate resources to a station from the selected channel combination. That is, the access point selects an optimal station using the index information and the channel quality information and allocates a beam for the selected station from the selected channel combination. The access point may perform a precoding operation using a precoding vector corresponding to the index information transmitted from the selected station.

As a result, throughput can be improved by reducing an amount of feedback information. Further, data can be transmitted and received with further higher throughput using a white frequency band by selecting an optimal channel combination using the channel capacity information of the channel combination and allocating resources based on the selected channel combination.

Meanwhile, the channel combination selection method in accordance with an embodiment of the present invention may be applied to a typical MU-MIMO method. That is, the channel combination selection method in accordance with an embodiment of the present invention may be applied to the MU-MIMO method that does not share precoding vector information in accordance with an embodiment of the present invention.

In case of the above described WLAN system, an orthogonal frequency division multiplexing (OFDM) scheme may be applied to. That is, in case of an OFDM WLAN system, different frequency selective fading is occurred at each sub-carrier. Accordingly, it is necessary to use different precoding vectors for each sub-carrier. Therefore, the OFDM WLAN system require more amount of feedback information that that of a system using a single sub-carrier. When a station does not recognize a sub-carrier included in own data, a reception error rate of the station may be increased.

Accordingly, the access point in accordance with an embodiment of the present invention may transmit sub-carrier detection information with data to a predetermined station when the access point in accordance with an embodiment of the present invention transmits data to the predetermined station. Here, the sub-carrier detection information indicates a sub-carrier. The station effectively detects a sub-carrier included in data using the sub-carrier detection information.

In the embodiment of the present invention, a plurality of adjacent sub-carriers may be grouped by the predetermined number of sub-carriers, and different precoding vectors may be allocated to each group of sub-carriers. That is, the precoding vector information may include information about a precoding vector for a sub-carrier group which is grouped by the predetermined number of sub-carriers. The sub-carriers in the same group may use the same precoding vector. For example, the same precoding vector may be used for the sub-carriers in the same group by setting channel information for the sub-carriers in the same group as an average value or the same value. And the station may feed back the different precoding vectors allocated to the each group of sub-carriers to the access point.

In this case, it is not necessary for the station to feed back index information of precoding vectors corresponding to each one of the plurality of sub-carriers to the access point. Therefore, the amount of feedback information reduced. Further, the access point transmits the sub-carrier detection information about grouped sub-carriers to the station. Therefore, the overhead of the access point may be reduced.

Figure 2:
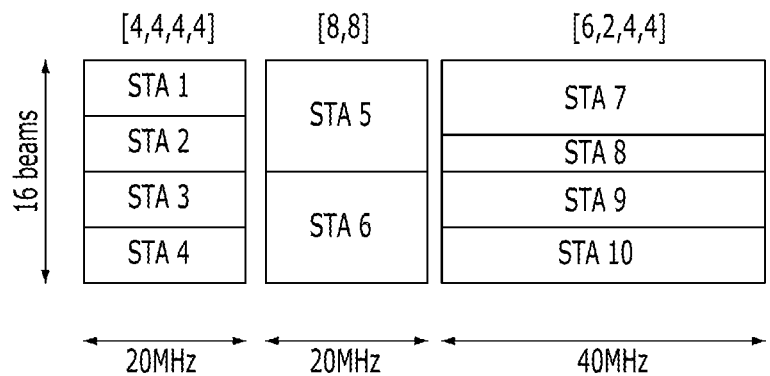
FIG. 2 is a diagram illustrating resource allocation in accordance with an embodiment of the present invention.

FIG. 2 is a diagram illustrating resource allocation in accordance with an embodiment of the present invention.

In FIG. 2, resource allocation of the WLAN system of FIG. 1 is described as an embodiment of the present invention. In FIG. 2, M is 16 and a channel combination $\{f^1, f^2, f^7\}$ is selected.

As shown in FIG. 2, among 16 beams of each channel band, four beams of a channel band $f^1$ are allocated to first to fourth stations. Further, fifth and six stations are allocated with 8 beams of a channel band $f^2$. A seventh station is allocated with 6 beams, an eighth station is allocated with 2 beams, and ninth and tenth stations are allocated with four beams of a channel band $f^7$.

Hereinafter, a MU-MIMO method of an access point and a station in a WLAN system using multi-channels in accordance with an embodiment of the present invention will be described.

Figure 3:
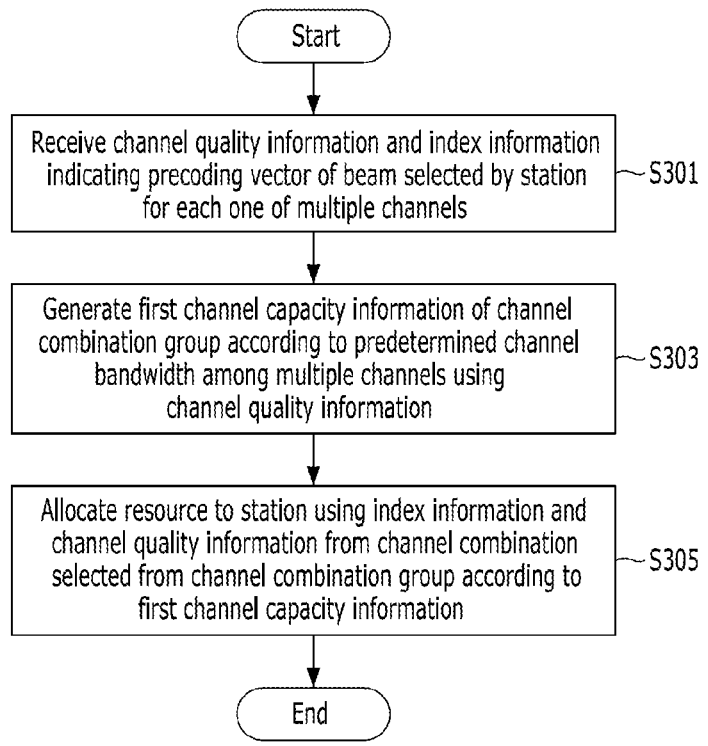
FIG. 3 is a diagram illustrating a MU-MIMO method in accordance with an embodiment of the present invention.

FIG. 3 is a flowchart illustrating a MU-MIMO method in accordance with an embodiment of the present invention.

In FIG. 3, a MU-MIMO method for an access point in a WLAN system using multi-channels and including at least one station in accordance with an embodiment of the present invention will be described.

Referring to FIG. 3, at step S301, an access point receives index information and channel quality information of multi-channels from a station. Here, the index information indicates a precoding vector of a beam selected by the station. That is, the station selects at least one beam from a plurality of beams according to the channel quality information. Here, the access point and the station share the precoding vector information for the plurality of beams for MU-MIMO. That is, the access point and the station may previously store the precoding vector information. The channel quality information may be SINR information or SNR information. Here, the precoding vector information includes information about a precoding vector for each one of the plurality of beams as beam-forming vector information to perform a precoding operation for MU-MIMO.

At step S303, the access point generates first channel capacity information of a channel combination group according to a predetermined channel band among multi-channels using the channel quality information. Particularly, the step S303 may further include generating second channel capacity information for each one of the multi-channels, and generating the first channel capacity information of a channel combination included in the channel combination group using the second channel capacity information.

At step S305, the access point allocates resources from a channel combination selected from the channel combination group to the station according to the first channel capacity information using the index information and the channel quality information. Particularly, the step S305 includes selecting a channel combination from the channel combination group according to the first capacity information, and allocating a beam corresponding to the index information from the selected channel combination according to the channel quality information. The step S305 may further include performing a precoding operation using a precoding vector corresponding to the index information.

Meanwhile, the MU-MIMO method in accordance with an embodiment of the present invention may further include transmitting a channel estimation preamble to the station. The station may generate channel quality information for each one of the plurality of beams for MU-MIMO using the channel estimation result information, which is estimated from the channel estimation preamble, and precoding vector information. Here, the channel estimation result information may be a channel matrix (H).

The access point may receive index information for MU-MIMO and channel quality information feedback from the station by transmitting a request for the index information and the channel quality information to the station. The access point receives a response of the request from the station, regards the station transmitting the response as a MU-MIMO candidate and transmits a channel estimation preamble to the MU-MIMO candidate.

Figure 4:
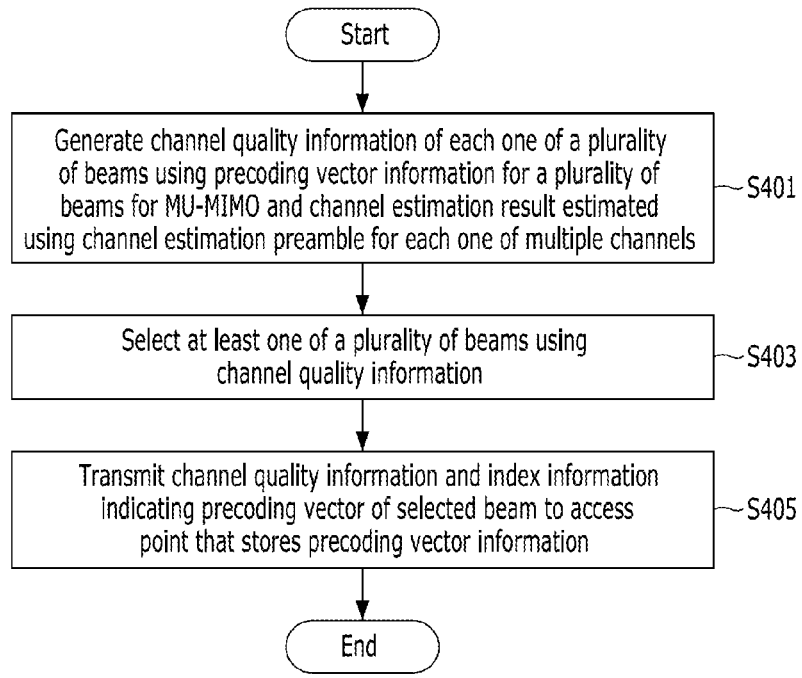
FIG. 4 is a flowchart illustrating a MU-MIMO method in accordance with another embodiment of the present invention.

FIG. 4 is a flowchart illustrating a MU-MIMO method in accordance with another embodiment of the present invention. In FIG. 4, a MU-MIMO method of a station in a WLAN system using multi-channels in accordance with an embodiment of the present invention is described.

Referring to FIG. 4, at step S401, a station generate channel quality information for each one of a plurality of beams for multi-channels using channel estimation result information, which is estimated using a channel estimation preamble, and precoding vector information for a plurality of beams for MU-MIMO. As described above, the access point and the station share precoding vector information. The precoding vector information may be previously stored in the access point and the station. Here, the precoding vector information may include a precoding vector for each one of the plurality of beams as beam-forming vector information for performing a precoding operation for MU-MIMO. The channel quality information may be SINR information or SNR information.

At step s403, the station selects at least one from the plurality of beams using the channel quality information. The station may select a beam having the largest SINR value or a SINR value larger than a predetermined threshold value.

At step S405, the station transmits index information indicating a precoding vector of the selected beam and channel quality information to the access point. The station feeds back the index information and the channel quality information for at least one selected beam to the access point.

Meanwhile, the MU-MIMO method in accordance with an embodiment of the present invention may further include receiving a channel estimation preamble from the access point. That is, the station may generate channel estimation result information using a channel estimation preamble transmitted from the access point. The channel estimation result information may be a channel matrix (H).

The station may receive a request for the index information and the channel quality information from the access point and may transmit a response of the request to the access point. According to the response from the station, the access point may transmit the channel estimation preamble to the station.

Although the embodiments of the present invention were described in view of a process through FIG. 1 to FIG. 4, each step of the MU-MIMO method in accordance with an embodiment to the present invention may be understood in a view of hardware. Accordingly, the steps included in the MU-MIMO method in accordance with an embodiment of the present invention may be understood as constituent elements of an access point and a station for MU-MIMO.

That is, an access point for MU-MIMO in accordance with an embodiment of the present invention in a WLAN system using multi-channels and including at least one station may include an information receiver configured to receive index information indicating a precoding vector of a beam selected by a station and channel quality information for each one of multi-channels from the station, an information generator configured to generate first channel capacity information of a channel combination group according to a channel bandwidth predetermined among the multi-channels using the channel quality information, and an allocator configured to allocate resources to the station using the index information and the channel quality information from a channel combination selected among the channel combination group according to the first channel capacity information. The access point and the station previously store precoding vector information for a plurality of beams for MU-MIMO.

Further, a station for MU-MIMO in accordance with an embodiment of the present invention in a WLAN system using multi-channels may include an information generator configured to generate channel quality information for each one of the plurality of beams for each one of multi-channels using precoding vector information of the plurality of beams and channel estimation result information estimated through a channel estimation preamble received from the access point, a selector configured to select at least one from the plurality of beams using the channel quality information, and a transmitter configured to transmit the index information indicating a precoding vector for the selected beam and the channel quality information thereof to the access point that stores the precoding vector information.

Accordingly, overall throughput is improved by reducing an amount of feedback information and utilizing a white frequency channel.

The MU-MIMO method of a WLAN system in accordance with an embodiment of the present invention described above can be realized as a program and stored in a computer-readable recording medium such as CD-ROM, RAM, ROM, floppy disks, hard disks, magneto-optical disks and the like. Since the process can be easily implemented by those skilled in the art to which the present invention pertains, further description will not be provided herein.

While the present invention has been described with respect to the specific embodiments, it will be apparent to those skilled in the art that various changes and modifications may be made without departing from the spirit and scope of the invention as defined in the following claims.

What is claimed is:

1. A multi-user multi-input multi-output (MU-MIMO) method of an access point in a wireless local area network (WLAN) using multi-channels and having at least one station, the MU-MIMO method comprising:
   receiving index information indicating a precoding vector for a beam selected by the station and channel quality information for each one of the multi-channels;
   generating first channel capacity information of channel combination groups using the channel quality information wherein the channel combination groups are grouped according to a predetermined channel bandwidth of the multi-channels; and
   allocating resources to the station from a channel combination selected from the channel combination groups according to the first channel capacity information using the index information and the channel quality information,
   wherein the access point and the station previously store precoding vector information for a plurality of beams for the MU-MIMO.

2. The MU-MIMO method of claim 1, wherein said generating first channel capacity information includes:
   generating second channel capacity information for each one of the multi-channels using the channel quality information; and
   generating the first channel capacity information of a channel combination included in the channel combination group using the second channel capacity information.

3. The MU-MIMO method of claim 1, wherein the channel quality information is a signal to noise ratio.

4. The MU-MIMO method of claim 1, wherein said allocating resources to the station includes:
   selecting channel combination from the channel combination group according to the first channel capacity; and
   allocating a beam corresponding to the index information to the station from the selected channel combination according to the channel quality information.

5. The MU-MIMO method of claim 4, wherein said allocating resource to the station further includes:
   performing a precoding operation using a precoding vector corresponding to the index information.

6. The MU-MIMO method of claim 1, wherein the beam selected by the station is a beam selected according to the channel quality in formation.

7. The MU-MIMO method of claim 1, further comprising:
   transmitting a channel estimation preamble to the station,
   wherein the station generates the channel quality information for each one of the plurality of beams for MU-MIMO using channel estimation result information estimated from the channel estimation preamble and the precoding vector information.

8. The MU-MIMO method of claim 7, wherein the channel estimation result information is a channel matrix (H).

9. The MU-MIMO method of claim 1, further comprising:
   transmitting request information for the index information and the channel quality information to the station; and receiving response to the request information from the station.

10. The MU-MIMO method of claim 1, further comprising:
transmitting sub-carrier detection information to the station when the WLAN system is an orthogonal frequency division multiplexing (OFDM) system, where the sub-carrier detection information informs the station of a sub-carrier that include data among the sub-carriers.

11. The MU-MIMO method of claim 10, wherein the precoding vector information include a precoding vector for a sub-carrier group grouped with a predetermined number of sub-carriers among the plurality of sub-carriers.

12. A multi-user multi-input multi-output (MU-MIMO) method of a station in a wireless local area network (WLAN) using multi-channels, the MU-MIMO method comprising:
generating channel quality information for each one of a plurality of beams for each one of the multi-channels using precoding vector information of the plurality of beams and channel estimation result information, which is estimated through a channel estimation preamble;
selecting at least one among the plurality of beams using the channel quality information; and
transmitting index information indicating a precoding vector for the selected beam and the channel quality information to an access point that stores the precoding vector information.

13. The MU-MIMO method of claim 12, wherein the precoding vector information is previously stored in the station.

14. The MU-MIMO method of claim 12, wherein the channel quality information is a signal to noise ratio.

15. The MU-MIMO method of claim 12, further comprising:
receiving the channel estimation preamble from the access point,
wherein the channel estimation result information is a channel matrix (H).

16. The MU-MIMO method of claim 12, further comprising:
receiving request information for the index information and the channel quality information from the access point; and
transmitting response information for the request information to the access point.

17. An access point for multi-user multi-input multi-output (MU-MIMO) in a wireless local area network (WLAN) using multi-channels and including at least one stations, the access point comprising:
an information receiver configured to receive index information and channel quality information for each one of the multi-channel where the index information indicates a precoding vector for a beam selected by a station;
an information generator configured to generate first channel capacity information of a channel combination group according to a predetermined channel bandwidth among the multi-channels using the channel quality information; and
an allocator configured to allocate resource to the station from a channel combination selected among the channel combination groups according to the first channel capacity information using the index information and the channel quality information,
wherein the access point and the station previously store precoding vector information for a plurality of beams for the MU-MIMO.

18. A station for multi-user multi-input multi-output (MU-MIMO) in a wireless local area network (WLAN) using multi-channels, the station comprising:
an information generator configured to generate channel quality information for each one of a plurality of multi-beams for each one of the multi-channels using precoding vector information for the plurality of beams for the MU-MIMO and channel estimation result information, which is estimated through a channel estimation preamble received from an access point;
a selector configured to select at least one of the plurality of beams using the channel quality information; and
a transmitter configured to transmit index information indicating a precoding vector of the selected beam and the channel quality information to the access point that stores the precoding vector information.

* * * * *